United States Patent
Wang

(10) Patent No.: US 11,294,391 B2
(45) Date of Patent: Apr. 5, 2022

(54) MOVING ROBOT WITH IMPROVED IDENTIFICATION ACCURACY OF STEP DISTANCE

(71) Applicant: PixArt Imaging Inc., Hsin-Chu County (TW)

(72) Inventor: Guo-Zhen Wang, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 321 days.

(21) Appl. No.: 16/423,571

(22) Filed: May 28, 2019

(65) Prior Publication Data

US 2020/0379475 A1    Dec. 3, 2020

(51) Int. Cl.
| | |
|---|---|
| G06K 9/00 | (2006.01) |
| G05D 1/02 | (2020.01) |
| G06T 7/62 | (2017.01) |
| G06T 7/70 | (2017.01) |
| G06T 5/00 | (2006.01) |
| G06T 7/73 | (2017.01) |

(52) U.S. Cl.
CPC .......... *G05D 1/0246* (2013.01); *G05D 1/024* (2013.01); *G06T 5/00* (2013.01); *G06T 7/62* (2017.01); *G06T 7/70* (2017.01); *G06T 7/73* (2017.01); *G05D 2201/02* (2013.01); *G06T 2207/10016* (2013.01)

(58) Field of Classification Search
CPC .. G05D 1/0246; G05D 2201/02; G05D 1/024; G05D 2201/02; G05D 2201/0215; G05D 1/0236; G05D 1/0242; G05D 1/0255; G05D 1/0221; G06T 7/73; G06T 5/00; G06T 7/62; G06T 7/70; G06T 2207/10016; A47L 2201/04; G06K 9/00664; G01B 11/02; G01S 11/12
See application file for complete search history.

(56) References Cited

U.S. PATENT DOCUMENTS

| | | | | |
|---|---|---|---|---|
| 9,002,511 | B1* | 4/2015 | Hickerson | G01S 17/86 |
| | | | | 700/245 |
| 2005/0288079 | A1* | 12/2005 | Tani | G05D 1/0246 |
| | | | | 463/1 |
| 2006/0139249 | A1* | 6/2006 | Kang | G09G 3/22 |
| | | | | 345/75.2 |
| 2010/0265505 | A1* | 10/2010 | Gribkov | G01S 7/499 |
| | | | | 356/369 |
| 2012/0127077 | A1* | 5/2012 | Chen | G06F 3/0317 |
| | | | | 345/166 |
| 2016/0232679 | A1* | 8/2016 | Wang | G01S 17/89 |
| 2017/0206675 | A1* | 7/2017 | Bynoe | G06F 3/042 |

(Continued)

*Primary Examiner* — Amara Abdi
(74) *Attorney, Agent, or Firm* — Hauptman Ham, LLP

(57) ABSTRACT

There is provided a moving robot including a light projector, an image sensor and a processing unit. The light projector projects a vertical light segment toward a moving direction. The image sensor captures, toward the moving direction, an image frame containing a light segment image associated with the vertical light segment. The processing unit calculates a step distance and a segment feature according to the image frame, outputs a flag signal according to the segment feature to indicate whether the calculated step distance is confident or not, and perform a pixel interpolation in calculating the step distance to improve the identification accuracy.

19 Claims, 6 Drawing Sheets

(56) References Cited

U.S. PATENT DOCUMENTS

| | | | |
|---|---|---|---|
| 2017/0336796 A1* | 11/2017 | Jun | A47L 9/0488 |
| 2017/0344019 A1* | 11/2017 | Haegermarck | A47L 9/0477 |
| 2018/0352633 A1* | 12/2018 | Van De Sluis | H05B 47/18 |
| 2019/0018420 A1* | 1/2019 | Yee | A47L 9/2852 |
| 2019/0363028 A1* | 11/2019 | Jia | H01L 27/1259 |

* cited by examiner

MOVING ROBOT WITH IMPROVED IDENTIFICATION ACCURACY OF STEP DISTANCE

BACKGROUND

1. Field of the Disclosure

This disclosure generally relates to a moving robot and, more particularly, to a moving robot that may accurately identify the step distance even on an irregular operating surface and improve the identification accuracy using pixel interpolation.

2. Description of the Related Art

The cleaning robot has become one important product among various home appliances in a smart home. During operation, the cleaning robot builds up a working map through identifying distances from various obstacles.

In a cleaning robot adopting an image sensor as the detecting means, in addition to the regular surface such as a tile floor or a wood floor, the cleaning robot is also operated on other special surfaces such as a plush carpet. In this operation environment, error identification can frequently occur when the cleaning robot identifies a step distance in front according to an image frame captured by the image sensor. Accordingly, a complete working map may not be constructed accurately.

In addition, to reduce the total cost, a distance is identified according to the image frame captured by an image sensor having low resolution. However in this case, jitters can occur in the outputted distance values. Although this jitter problem can be solved by using an image sensor having high resolution, the goal of reducing cost cannot be achieved at the same time.

Accordingly, it is necessary to provide a moving robot that is adaptable to operate on an irregular operating surface and adopting an image sensor having low resolution.

SUMMARY

The present disclosure provides a moving robot adapted to operate on an irregular operating surface. The moving robot selects a proper method for the distance identification by identifying whether the light segment image in a captured image frame is too wide or is broken thereby broadening the surfaces on which the moving robot can operate.

The present disclosure further provides a moving robot that can improve the identification accuracy by performing the pixel interpolation within only a partial region of the captured image frame.

The present disclosure provides a moving robot including a light projector, an image sensor and a first processing unit. The light projector is configured to project a vertical light segment toward a moving direction. The image sensor is configured to capture an image frame containing a light segment image associated with the vertical light segment. The first processing unit is configured to calculate an image feature according to the light segment image in the image frame, and output a flag signal according to the image feature to indicate a confidence level of the image frame.

The present disclosure further provides a moving robot including a light projector, an image sensor and a first processing unit. The light projector is configured to project a vertical light segment toward a moving direction. The image sensor is configured to capture an image frame containing a light segment image associated with the vertical light segment. The first processing unit is configured to calculate an image feature and a step distance according to the light segment image in the image frame, and output the step distance and a flag signal indicating a confidence level of the step distance.

The present disclosure further provides a moving robot including a memory, a light projector, an image sensor and a processing unit. The memory is configured to store a gray level threshold. The light projector is configured to project a vertical light segment toward a moving direction. The image sensor is configured to capture an image frame containing a light segment image associated with the vertical light segment. The processing unit is configured to calculate gray level sums of every pixel column of multiple pixel columns of the image frame, identify two pixel columns having the gray level sums closest to the gray level threshold, perform a pixel interpolation on the two pixel columns and two pixel rows closest to the gray level threshold, and calculate a current step distance according to a segment height corresponding to an interpolated subpixel column position.

The present disclosure further provides a moving robot including a light projector, an image sensor, a second sensor and a processing unit. The light projector is configured to project a light stripe toward a moving direction. The image sensor is configured to capture an image frame containing a light stripe image associated with the light stripe. The processing unit is configured to calculate an image feature according to the light stripe image in the image frame. The moving robot is configured to use the second sensor to sense an area toward the moving direction when the image feature does not within a predetermined range.

In one aspect, the predetermined range is referred to a width range of the light stripe image and/or a range of a number of dips of the light stripe image. The area toward the moving direction is determined according to a detection range of the second sensor. The second sensor is turned on or turned off when the image sensor is capturing the image frame. The image sensor is turned on or turned off when the moving robot uses the second sensor for the detection.

In the moving robot of the present disclosure, the processing unit is arranged inside a sensing chip. The processing unit outputs a flag signal via an independent leg of the sensing chip. The flag signal is used to indicate a confidence level of a step distance calculated by the processing unit. When a low confidence level is indicated, the flag signal is used to inform a central processing unit (CPU) or a microcontroller unit (MCU) of the moving robot to trigger another sensor or use a built-in look up table to identify a current step distance. When a high confidence level is indicated, the flag signal is used to inform the CPU or the MCU of the moving robot to directly use the current step distance outputted by the sensing chip.

In the conventional moving robot, the front end of a light segment image in the captured image frame jumps between two pixels to cause the output distance value to have a large jitter. Therefore in the present disclosure, the processing unit performs the pixel interpolation between two pixel columns that have gray level sums closest to a predetermined brightness threshold, and gray level data of other pixel columns is removed from a line buffer. In this way, the identification accuracy of the moving robot is improved without using a frame buffer.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The moving robot of every embodiment of the present disclosure is to accurately calculate a step distance (or referred to a cliff distance) in front of a moving direction so as to prevent falling and to accurate construct a working map on various operating surfaces.

Figure 1:
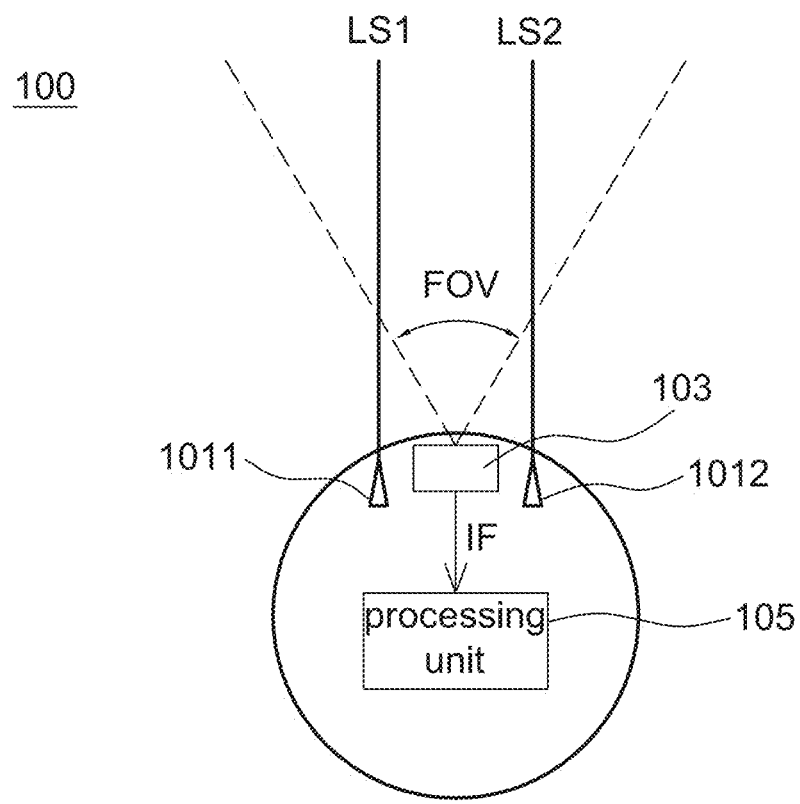
FIG. 1 is a top view of a moving robot according to one embodiment of the present disclosure.
Figure 2:
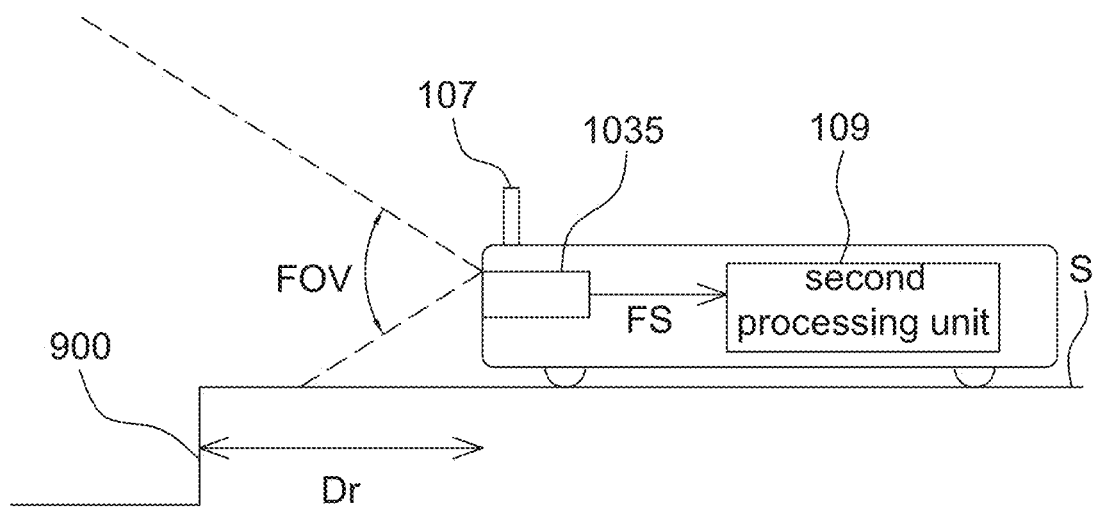
FIG. 2 is a side view of a front step and a moving robot according to one embodiment of the present disclosure.

Referring to FIGS. 1 and 2 together, FIG. 1 is a top view of a moving robot 100 according to one embodiment of the present disclosure; and FIG. 2 is a side view of a step 900 in front and a moving robot 100 according to one embodiment of the present disclosure.

The moving robot 100 includes at least one light projector (e.g., FIG. 1 showing a first light projector 1011 and a second light projector 1012), an image sensor 103 and a processing unit 105, wherein the image sensor 103 and the processing unit 105 forms a sensing chip 1035 (as shown in FIG. 2) to be installed on the moving robot 100 and coupled to a second processing unit 109, e.g., a central processing unit (CPU) or a microcontroller unit (MCU), of the moving robot 100. In some aspects, the at least one light projector is also included in the sensing chip 1035.

It is appreciated that although FIG. 1 shows two light projectors, a single light projector is enough for calculating a step distance Dr in front. Two light projectors are for increasing a detection range in front of the moving direction.

Each of the first light projector 1011 and the second light projector 1012 includes a light source and a diffractive optical element (DOE). The light source is preferably a coherent light source for emitting light of an identifiable spectrum, e.g., an infrared laser diode, but not limited to. Besides, the light source is selected from a partially coherent light source or non-coherent light source. After the light emitted by the light source passes the diffractive optical element, a linear (i.e., length much larger than width) light segment is formed.

The first light projector 1011 and the second light projector 1012 respectively project a vertical (corresponding to an operating surface S shown in FIG. 2) light segments or light stripes LS1 and LS2 toward a moving direction. When there is no obstacle in front of the moving direction, two parallel light segments LS1 and LS2 are formed on the operating surface in front. When there is a step 900 (e.g., FIG. 2 showing a cliff at a distance Dr) in front of the moving direction, the light segments LS1 and LS2 disappear at the distance Dr. If the distance Dr is longer, lengths of the light segments LS1 and LS2 are longer; on the contrary, if the distance Dr is shorter, lengths of the light segments LS1 and LS2 are shorter. In this way, lengths of the light segments LS1 and LS2 reflect a step distance Dr in front of the moving robot 100.

Figure 3:
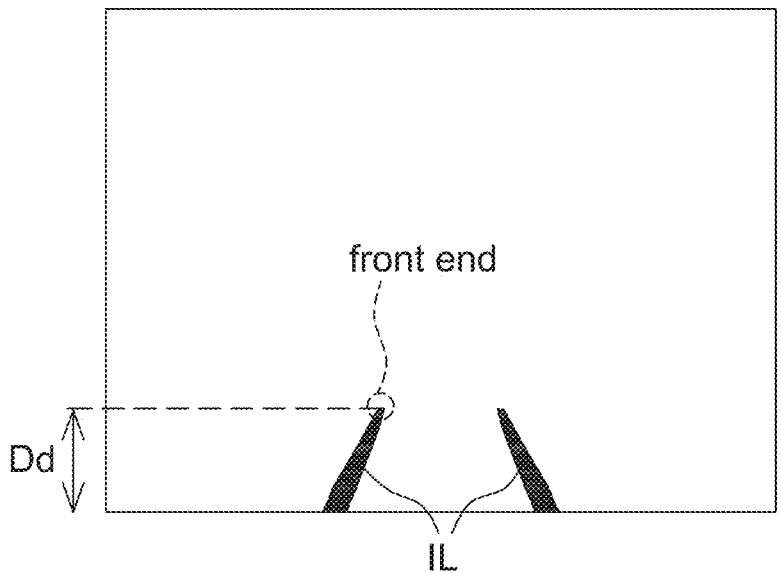
FIG. 3 is a schematic diagram of an image frame captured by a moving robot according to one embodiment of the present disclosure.

The image sensor 103 is a CCD image sensor, a CMOS image sensor or other sensors for converting light energy to electrical signals. The image sensor 103 has a plurality of pixels arranged in a matrix and operates at a predetermined frame rate toward the moving direction. The image sensor 103 captures, with a field of view FOV, an image frame IF containing light segment images IL associated with the light segments LS1 and LS2 as shown in FIG. 3. It is appreciated that if a single light projector is used, the image frame IF contains one light segment image IL.

The processing unit 105 is, for example, a digital signal processor (DSP) or an application specific integrated circuit (ASIC), and is electrically connected to the at least one light projector and the image sensor 103 for controlling the light source to emit light corresponding to the image capturing of the image sensor 103. The processing unit 105 receives the image frame IF outputted by the image sensor 103, and calculates an image feature and a step distance Dr according to the light segment images IL in the image frame IF associated with the light segments LS1 and LS2. The image feature is used to identify whether a current operating surface is a flat surface or not to accordingly determine a proper calculation method. It is able to obtain a corresponding step distance Dr using a look up table or an algorithm when obtaining a vertical length (referred to a segment height below) of a light segment image IL in the image frame IF.

Figure 4:
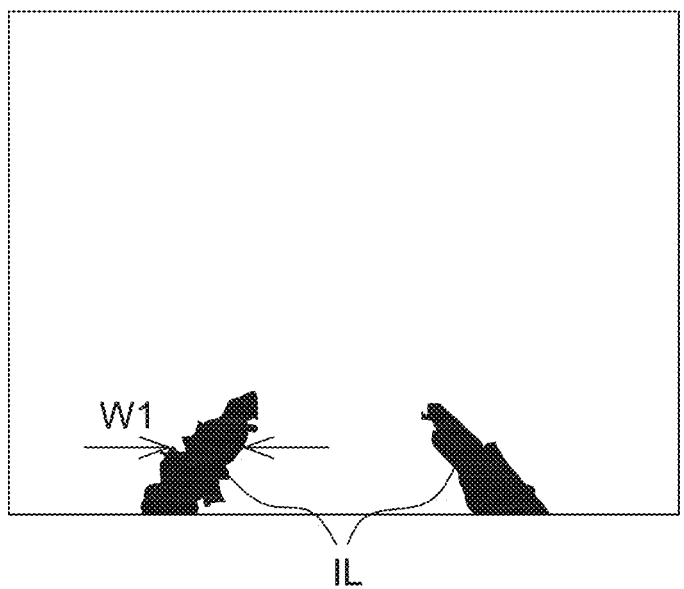
FIG. 4 is a schematic diagram of an image frame of an irregular operating surface captured by a moving robot according to one embodiment of the present disclosure.

For example referring to FIG. 4, it shows an image frame IF of a plush carpet captured by the image sensor 103. It is seen that a width W1 of the light segment image IL in FIG. 4 is wider than that of FIG. 3. The processing unit 105 further includes a memory for pre-storing a width threshold. When the processing unit 105 identifies that the width W1 of the light segment image IL in the image frame IF is wider than the width threshold, it means that the current operating surface is an irregular surface.

In some aspects, the memory of the moving robot 100 pre-stores multiple different width thresholds corresponding to different operating surfaces. The processing unit (105 or an external processing unit outside the sensing chip 1035) identifies a type of an operating surface according to the width W1 of the light segment image IL in the image frame IF. The memory stores the relationship between the segment height Dd and the step distance Dr corresponding to different types of the operating surface.

Figure 5A:
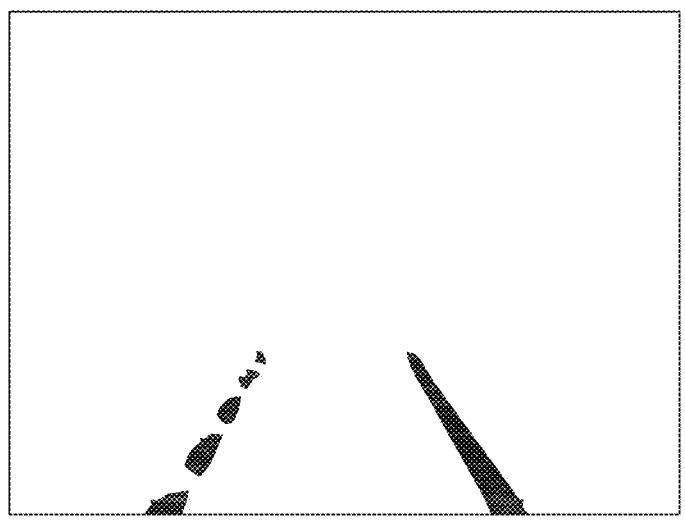
FIG. 5A is another schematic diagram of an image frame of an irregular operating surface captured by a moving robot according to one embodiment of the present disclosure.

Referring to FIG. 5A, it shows an image frame IF of a current operating surface, which has ridges and valleys, captured by the image sensor 103. It is seen from FIG. 5A that the light segment image IL is a broken line because a part of the current operation surface, e.g., the valleys, is not illuminated by the light segment LS1. When the processing unit 105 identifies that the light segment image IL in the image frame IF is a broken line, it means that a current operating surface is an irregular surface.

Figure 5B:
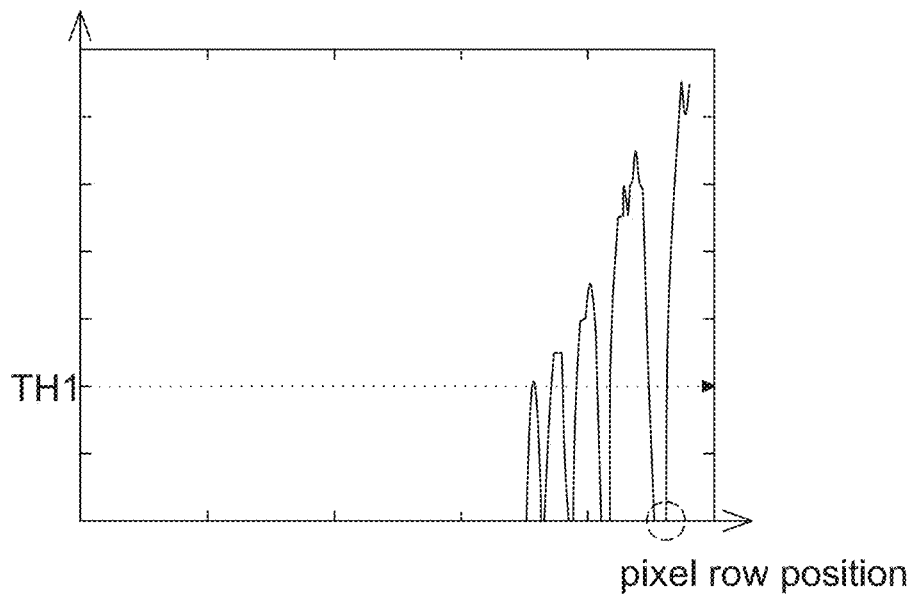
FIG. 5B is a schematic diagram of identifying a broken light segment image in the image frame of FIG. 5A.

One way to identify the broken line is shown in FIG. 5B for illustration purposes. The processing unit 105 calculates gray level sums every pixel row of multiple pixel rows of the image frame IF, or divides the image frame IF into a left image frame and a right image frame (in the case having two light projectors) at first and then respectively calculates gray level sums of multiple pixel rows of the left and right image frames. As shown in FIG. 5B, the processing unit 105 obtains the relationship between the gray level sums and the pixel row positions. The processing unit 105 determines whether a broken line exists by using a gray level threshold TH1, e.g., a dip lower than the gray level threshold TH1 appearing between two peaks of the gray level sums. By properly selecting the gray level threshold TH1, a broken light segment image IL is confirmed when the processing unit 105 identifies more than one dip.

In other words, the image feature of the present disclosure includes the segment width W1 of the light segment image IL (as shown in FIG. 4) and whether the light segment image IL is a broken line (e.g., according to a number of dips of gray level sums of pixel rows in FIG. 5B).

In the present disclosure, the processing unit 105 outputs a flag signal FS according to the image feature to indicate the type of an operating surface, select a suitable distance calculation algorithm, indicate a confidence level of an image frame and/or indicate a confidence level of an outputted step distance. For example, the sensing chip 1035 has an independent leg (not shown) for exclusively outputting the flag signal FS. Said independent is referred to that the leg is only for outputting the flag signal FS without outputting other signals (e.g., not outputting the step distance Dr obtained by the processing unit 105).

Figure 6:
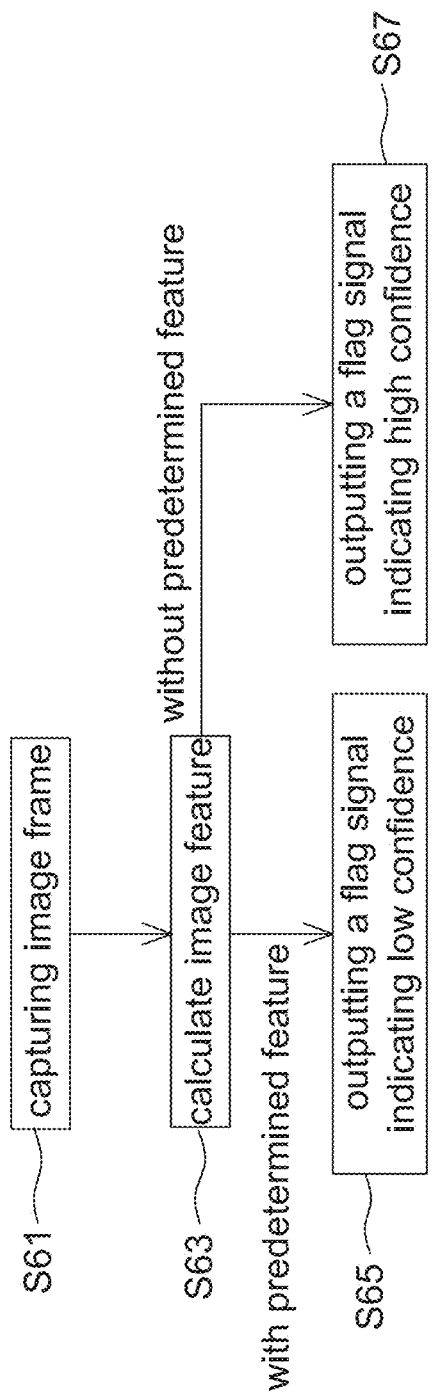
FIG. 6 is a flow chart of an operating method of a moving robot according to one embodiment of the present disclosure.

Referring to FIG. 6, it is an operational flow chart of a moving robot of the present disclosure that is adaptable to the moving robot 100 shown in FIGS. 1 and 2. The operating method includes the steps of: capturing an image frame by an image sensor (Step S61); calculating an image feature of a light segment image in the image frame (Step S63), outputting a flag signal indicating a low confidence level when the image feature includes a predetermined feature (Step S65); and outputting a flag signal indicating a high confidence level when the image feature does not include the predetermined feature (Step S67), wherein the predetermined feature is shown in FIGS. 4 and 5A. The confidence level is represented by a digital signal having a predetermined bit (e.g., 1 to 2 bits), e.g., 01 indicating the high confidence level and 10 indicating the low confidence level, but not limited thereto.

Step S61: The processing unit 105 controls the light projectors 1011 and 1012 to emit light and controls the image sensor 103 to output an image frame IF containing light segment images IL as shown in FIGS. 3, 4 and 5A.

Step S63: After receiving the image frame IF from the image sensor 103, the processing unit 105 identifies whether the light segment image IL in the image frame IF is too wide or is a broken line (i.e. having predetermined feature) so as to identify a confidence level of the image frame IF or the obtained step distance Dr.

S65-S67: These two steps have several implementations. In one aspect, no matter whether the image frame IF includes a predetermined feature, the processing unit 105 firstly calculates and outputs a step distance Dr. The processing unit 105 also outputs a digital signal having at least one bit to indicate whether the obtained step distance Dr is confident or not. It is the external processing unit (e.g., the CPU or MCU of the moving robot 100) outside the sensing chip 1035 to determine whether to use the step distance Dr calculated by the processing unit 105. If the step distance Dr is not used (low confidence level), it means that the moving robot 100 adopts another algorithm or uses a look up table to determine a current step distance. As mentioned above, different look up tables are constructed corresponding to different types of the operating surface.

In another aspect, although the processing unit 105 is arranged to always calculate a step distance Dr, the calculated step distance Dr is outputted only when a high confidence level is identified. When identifying a low confidence level, the processing unit 105 does not output the calculated step distance Dr.

In an alternative aspect, the processing unit 105 calculates a step distance Dr only when a high confidence level is identified. The processing unit 105 does not calculate the step distance Dr when a low confidence level is identified.

As mentioned above, the processing unit 105 identifies a segment height (e.g., Dd in FIG. 3) of a light segment image IL in the image frame IF to accordingly identify a step distance Dr. The relative relationship between the segment height Dd and the step distance Dr is calculated using a previously constructed look up table or a predetermined algorithm, wherein the segment height Dd is referred to a number of pixel rows containing the light segment image IL.

In one non-limiting aspect, the moving robot 100 further includes a memory (outside the sensing chip 1035) for previously storing a look up table containing the relationship between multiple segment heights of the light segment image IL and multiple step distances regarding special operating surfaces. When the sensing chip 1035 outputs a flag signal FS indicating a low confidence level (i.e. indicating a special operating surface), the external processing unit outside the sensing chip 1035 (e.g., 109 shown in FIG. 2) accesses the look up table to identify a current step distance and ignores the step distance Dr outputted by the processing unit 105.

In another non-limiting aspect, the moving robot 100 further includes a second sensor (e.g., 107 in FIG. 2). The second sensor 107 is preferable not an image sensor, e.g. an ultrasonic sensor or a distance sensor. When the sensing chip 1035 outputs a flag signal FS indicating a low confidence level, the second processing unit 109 activates the second sensor 107 to detect a current step distance and ignore the step distance Dr outputted by the processing unit 105.

That is, the concept of the present disclosure is in that although the processing unit 105 may calculate a step distance Dr in all conditions, the calculated step distance Dr has a shift from an actual distance to cause an error when the moving robot 100 is operating on a special surface. Therefore, the processing unit 105 further identifies a segment feature of the light segment image IL to determine whether to calculate a correct current step distance using other ways, e.g., using another sensor or a predetermined look up table.

In the present disclosure, before calculating the image feature of the light segment image IL, the processing unit 105 further digitizes the image frame IF based on a digitizing threshold (e.g., setting the pixel position having a gray value larger than the digitizing threshold as 1 and setting the pixel position having a gray value smaller than the digitizing threshold as 0, or vice versa) to facilitate the calculation of the light segment image IL, image feature and the segment height Dd, e.g., a region that is set as 1 is identified as a light segment image IL.

In addition, in an aspect using two light projectors and before calculating the image feature of the light segment images IL, the processing unit 105 further divides the image frame IF into a left image frame and a right image frame respectively containing one light segment image IL. The processing unit 105 further calculates one image feature and one step distance of the one light segment image IL respectively in the left image frame and the right image frame. That is, the processing unit 105 calculates two image features and two step distances according to one image frame IF. The processing unit 105 identifies the confidence level according to the two image features. The processing unit 105 outputs two step distances or one average of the two distances according to different applications.

Because the gray level of a front end of the light segment image IL in the image frame IF changes due to noises and environment, the calculated step distance has jitters due to the change. To solve this problem, the moving robot 100 of the present disclosure further has a memory for storing a gray level threshold. TH2 for identifying a pixel position of the front end of the light segment image IL. The gray level threshold TH2 is a predetermined fixed value, or a varied value determined according to gray value sums of one pixel column or one image frame not containing the light segment image IL. In one aspect, the gray level threshold TH2 is determined according to white noises in the image frame.

Figure 7A:
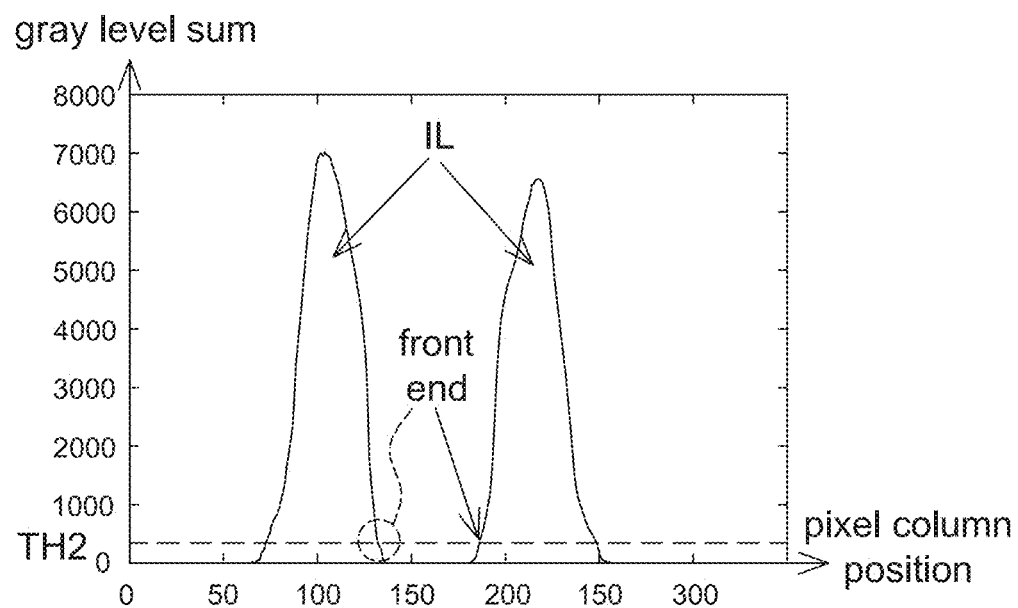
FIG. 7A is a schematic diagram of a gray level threshold and gray level sums of pixel columns of an image frame captured by a moving robot according to one embodiment of the present disclosure.
Figure 7B:
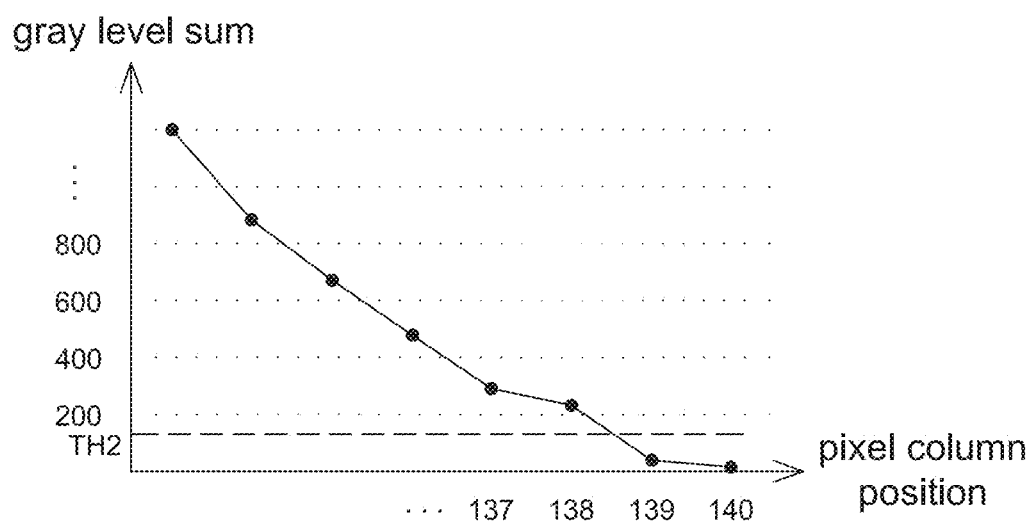
FIG. 7B is a partially enlarged diagram of FIG. 7A.

When the image sensor 103 outputs an image frame IF as shown in 11G. 3, the processing unit 105 calculates gray level sums of every pixel column of multiple pixel columns of the image frame IF to obtain the relationship between gray level sums and pixel column positions (assuming a size of the image frame being 240×320, but not limited to) as shown in FIG. 7A. The processing unit 105 then identifies two pixel columns having the gray level sums closest to the gray level threshold TH2, e.g., FIG. 7B showing the $138^{th}$ and $139^{th}$ pixel columns at two sides of the gray level threshold TH2, wherein FIG. 7B is an enlarged diagram of FIG. 7A. Next, the processing unit 105 performs the pixel interpolation on the two pixel columns, e.g., FIG. 8 showing 10 identical distances being interpolated between the $138^{th}$ and $139^{th}$ pixel columns, and at least two pixel rows closest to the gray level threshold TH2.

Figure 8:
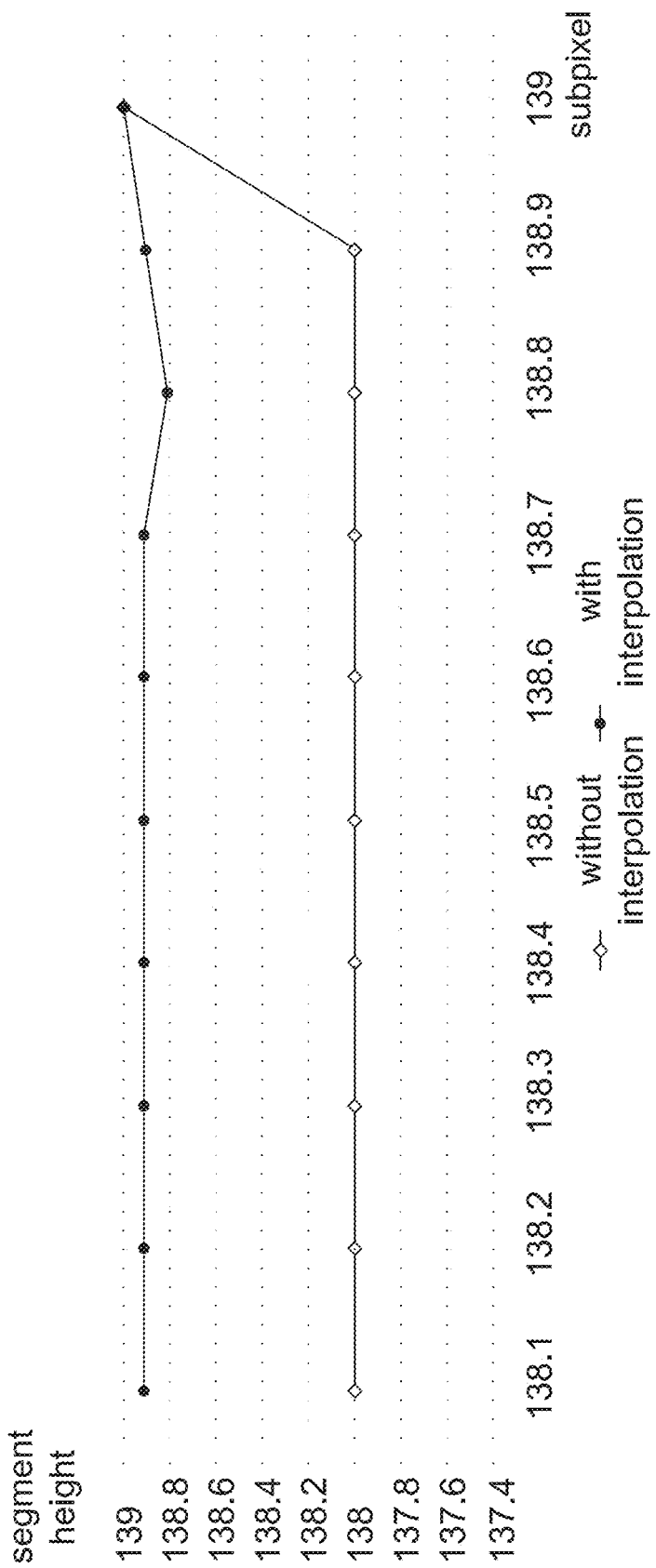
FIG. 8 is a schematic diagram of the uttering of the pixel position of a front end of a light segment image with and without pixel interpolation.

It is seen from FIG. 8 that in the case without the pixel interpolation, the front end of the light segment image IL in the image frame IF associated with the light segment (LS1 or LS2) jumps between the $138^{th}$ and $139^{th}$ pixel rows, each jump covering one pixel range. In the case with the pixel interpolation, the front end of the light segment image IL in the image frame IF associated with the light segment (LS1 or LS2) jumps between the $138.8^{th}$ and $139^{th}$ pixel rows, each jump covering only sub-pixel range. The processing unit 105 calculates the step distance Dr according to a segment height of the $138.8^{th}$ to $139^{th}$ pixel rows to obtain a more accurate result. In other aspects, the processing unit 105 performs the interpolation on all pixel columns to be stored in a larger line buffer.

It should be mentioned that although FIG. 7A shows each light segment image IL having two points intersecting with the gray level threshold TH2, the pixel columns to be interpolated are selected corresponding the front end of the light segment image IL in the image frame IF to accordingly calculate the segment height Dd. The processing unit 105 associates the gray level sums of every pixel column with a corresponding position of the light segment image IL in calculating the gray level sums.

Similarly, when two light projectors are used, the processing unit 105 respectively performs the pixel interpolation on pixels corresponding to two front ends of two light segment images IL to respectively obtain two segment heights Dd having a sub-pixel level to accordingly calculate two corresponding step distances Dr.

As mentioned above, the conventional cleaning robot has the problem of unable to accurately identify a step distance on a special operating surface. Accordingly, the present disclosure further provides a moving robot (e.g., FIGS. 1-2) that further outputs a flag signal for indicating whether a current operating surface is a special operating surface to accordingly determine an algorithm or sensor for calculating the step distance. In addition, by performing the pixel interpolation at a front end of a light segment image, the amplitude jitter of the obtained step distance is reduced without using a frame buffer to improve the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A moving robot, comprising:
   a light projector configured to project a vertical light segment toward a moving direction;
   an image sensor configured to capture an image frame containing a light segment image associated with the vertical light segment; and
   a first processing unit configured to
      calculate an image feature according to the light segment image in the image frame,
      output a flag signal according to the image feature to indicate a confidence level of the image frame,
      identify a segment height of the light segment image,
      calculate and output a current step distance according to the segment height when the flag signal indicates a high confidence level, and
      not output the current step distance when the flag signal indicates a low confidence level.

2. The moving robot as claimed in claim 1, wherein the first processing unit is arranged inside a sensing chip which comprises an independent leg configured to output the flag signal.

3. The moving robot as claimed in claim 1, wherein the image feature comprises a segment width of the light segment image and whether the light segment image is a broken line.

4. The moving robot as claimed in claim 1, further comprising:
   a memory configured to previously store a look up table regarding a relationship between multiple segment heights of the light segment image and multiple step distances; and
   a second processing unit configured to access the look up table to identify another current step distance when the flag signal indicates the low confidence level.

5. The moving robot as claimed in claim 1, further comprising:
   a second sensor, which is not an image sensor; and
   a second processing unit configured to activate the second sensor to detect another current step distance when the flag signal indicates the low confidence level.

6. The moving robot as claimed in claim 1, wherein the first processing unit is further configured to
not calculate the current step distance when the flag signal indicates the low confidence level.

7. The moving robot as claimed in claim 1, wherein the first processing unit is further configured to
calculate gray level sums of every pixel column of multiple pixel columns of the image frame,
identify two pixel columns having the gray level sums closest to a predetermined gray level threshold, and
perform a pixel interpolation on the two pixel columns and two pixel rows closest to the predetermined gray level threshold.

8. The moving robot as claimed in claim 1, further comprising another light projector configured to project another vertical light segment toward the moving direction, and the first processing unit is further configured to
digitize the image frame by a digitizing threshold,
divide the image frame into a left image frame and a right image frame respectively containing one light segment image, and
respectively calculate an image feature of the one light segment image in the left image frame and the right image frame.

9. A moving robot, comprising:
a light projector configured to project a vertical light segment toward a moving direction;
an image sensor configured to capture an image frame containing a light segment image associated with the vertical light segment;
another light projector configured to project another vertical light segment toward the moving direction; and
a first processing unit configured to
digitize the image frame by a digitizing threshold,
divide the image frame into a left image frame and a right image frame respectively containing one light segment image,
respectively calculate an image feature and a step distance according to the one light segment image in the left image frame and the right image frame, and
output the step distance and a flag signal indicating a confidence level of the step distance.

10. The moving robot as claimed in claim 9, wherein the first processing unit is arranged inside a sensing chip which comprises a leg configured to output the flag signal but not output the step distance.

11. The moving robot as claimed in claim 9, wherein the image feature comprises a segment width of the one light segment image and whether the one light segment image is a broken line.

12. The moving robot as claimed in claim 9, further comprising:
a memory configured to previously store a look up table regarding a relationship between multiple segment heights of the one light segment image and multiple step distances; and
a second processing unit configured to access the look up table to identify a current step distance and ignore the step distance outputted by the first processing unit when the flag signal indicates a low confidence level.

13. The moving robot as claimed in claim 9, further comprising:
a second sensor, which is not an image sensor; and
a second processing unit configured to activate the second sensor to detect a current step distance and ignore the step distance outputted by the first processing unit when the flag signal indicates a low confidence level.

14. The moving robot as claimed in claim 9, wherein the first processing unit is further configured to
calculate gray level sums of every pixel column of multiple pixel columns of the image frame,
identify two pixel columns having the gray level sums closest to a predetermined gray level threshold, and
perform a pixel interpolation on the two pixel columns and two pixel rows closest to the predetermined gray level threshold.

15. A moving robot, comprising:
a memory configured to store a gray level threshold;
a light projector configured to project a vertical light segment toward a moving direction;
an image sensor configured to capture an image frame containing a light segment image associated with the vertical light segment; and
a processing unit configured to
calculate gray level sums of every pixel column of multiple pixel columns of the image frame,
identify two pixel columns having the gray level sums closest to the gray level threshold,
perform a pixel interpolation on the two pixel columns and two pixel rows closest to the gray level threshold, and
calculate a current step distance according to a segment height corresponding to an interpolated subpixel column position.

16. The moving robot as claimed in claim 15, wherein the gray level is
a predetermined fixed value, or
a varied value determined according to the gray level sum of one pixel column not containing the light segment image.

17. The moving robot as claimed in claim 15, wherein the two pixel columns correspond to a front end of the light segment image.

18. The moving robot as claimed in claim 15, wherein the segment height is a number of pixel rows containing the light segment image.

19. A moving robot, comprising:
a light projector configured to project a light stripe toward a moving direction;
an image sensor configured to capture an image frame containing a light stripe image associated with the light stripe;
a second sensor; and
a processing unit configured to calculate an image feature according to the light stripe image in the image frame to accordingly output a flag signal,
wherein the moving robot is configured to use the second sensor to sense an area toward the moving direction when the flag signal indicates a low confidence level.

* * * * *